(12) United States Patent
Kim

(10) Patent No.: US 6,411,688 B1
(45) Date of Patent: Jun. 25, 2002

(54) METHOD FOR TRANSFERRING DIAL TONE IN REAL TIME IN COMPUTER COMMUNICATION SYSTEM

(75) Inventor: In-Ho Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/172,192

(22) Filed: Oct. 14, 1998

(30) Foreign Application Priority Data

Oct. 14, 1997 (KR) .............................................. 97-52636

(51) Int. Cl.[7] ............................................ H04M 11/00
(52) U.S. Cl. ................................ 379/93.26; 379/355.03
(58) Field of Search ......................... 379/93.26–93.36, 379/93.01, 354, 355.01–355.03, 357.04

(56) References Cited

U.S. PATENT DOCUMENTS

| 5,440,627 A | 8/1995 | Puri |
| 5,530,894 A | 6/1996 | Farrell et al. |
| 5,572,572 A | 11/1996 | Kawan et al. |
| 5,673,257 A | 9/1997 | Sharma et al. |
| 5,802,152 A | * 9/1998 | DeLaine, Jr. ............ 379/93.26 |

* cited by examiner

Primary Examiner—Wing F. Chan
(74) Attorney, Agent, or Firm—Robert E. Bushnell, Esq.

(57) ABSTRACT

A method for transferring dual tone multifrequency (DTMF) signals in real time in a computer communications system for performing a telephone call via a modem. In the method, virtual connection with the modem is performed before a user inputs a connection number, wherein the modem is regarded as the external device to be connected. Then, when the virtual connection is achieved, a dual tone multifrequency (DTMF) signal corresponding to a number is transferred in real time through the modem whenever the user inputs the connection numbers one by one.

20 Claims, 5 Drawing Sheets

METHOD FOR TRANSFERRING DIAL TONE IN REAL TIME IN COMPUTER COMMUNICATION SYSTEM

This application makes reference to, incorporates the same herein, and claims all benefits accruing under 35 U.S.C. § 119 from an application entitled Method for Transferring Dial Tone in Real Time in Computer Communication System earlier filed in the Korean Industrial Property Office on the Oct. 14, 1997, and there duly assigned Ser. No. 97-52636, a copy of which is annexed hereto.

BACKGROUND OF THE INVENTION

1. Technical Field

The present invention relates to computer communications, and more particularly to a method of connecting a computer system to an external device, with the use of a modem, for the purpose of communicating.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse or other input device such as a trackball, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

A computer system today can be used as a communications device when the computer system is connected with a telephone line via a modem. In other words, when a telephone line is connected to a modem and the modem is then connected to a computer system, a first user can utilize the computer system to place a telephone call to a second user. Presuming that the first user is utilizing a computer system and the second user is utilizing a standard tone telephone set, the telephone call can be placed when the first user enters the second user's telephone number into the computer system with the use of the keyboard of the computer system. When the second user answers the call using the standard tone telephone set, the first user can speak into a microphone connected to the computer system to talk to the second user, and the first user can listen to a speaker connected to the computer system to hear the second user. Additionally, a computer system can be used to receive a telephone call in a similar manner.

A telephone set in wide use today is known as a standard tone telephone set. The standard tone telephone set is a telephone set which uses a method called a dual tone multifrequency (DTMF) for sending a telephone number to a central office when placing a telephone call. The term "central office" refers to switching equipment that provides local exchange telephone service for a given geographical area, designated by the first three digits of a seven-digit telephone number in the United States of America. A local network is used to connect telephones in residences and businesses to central offices. Exchange area networks are disposed between local networks and long-distance networks.

The dual tone multifrequency (DTMF) method can only be utilized when the central office is equipped to process the dual tone multifrequency (DTMF) signals. Standard tone telephone sets have been replacing rotary dial telephone sets. Standard tone telephone sets include a push-button keypad for dialing. The push-button keypad has 12 keys, which represent the numbers 0 through 9 and the symbols * and #. Pressing one of these 12 keys causes an electronic circuit to generate two tones, each tone having a different frequencies. Hence the name dual tone multifrequency (DTMF).

There is a low frequency tone for each row of keys across the keypad and a high frequency for each column of keys down the keypad. Pressing key 7, for example, generates an 852 hertz tone and a 1,209 hertz tone. Pressing key 1, which is in the same column as key 7, generates a 697 hertz tone and the 1,209 hertz tone. Pressing key 9, which is in the same row as key 7, generates the 852 hertz tone and a 1,477 hertz tone. By using the dual tone method, 12 unique combinations are produced from only seven tones when the 12-position keypad is used.

When a computer system including a modem is connected to a telephone line, the computer system can be utilized to place a telephone call if the computer system can cause dual tone multifrequency (DTMF) signals to be transmitted to the telephone line. In this manner, the computer system is simulating the standard tone telephone set, described above, to cause the computer system to act as a communications device.

Exemplars of recent efforts in the art include U.S. Pat. No. 5,673,257 for a Computer-based Multifunction Personal Communication System issued to Sharma et al., U.S. Pat. No. 5,572,572 for a Computer and Telephone Apparatus with User Friendly Interface and Enhanced Integrity Features issued to Kawan et al., U.S. Pat. No. 5,530,894 foran Adapter for Interfacing a Computer to a Multichannel Digital Network, with Port for a Telephone issued to Farrell et al., and U.S. Pat. No. 5,440,627 for a Computer Phone Dialing System issued to Puri.

While these recent efforts provide advantages, I note that they fail to adequately address how a computer system can be conveniently and efficiently used as a communication device.

SUMMARY OF THE INVENTION

To solve the above problems, it is an objective of the present invention to provide a method for transferring a dial tone in real time in a computer communications system via a modulator-demodulator (modem).

To achieve the objective, there is provided a method for transferring a dial tone in real time in a computer communications system telephoning to an external device via a modem, the method comprising the steps of: (a) performing virtual connection with the modem before a user inputs a connection number, wherein the modem is regarded as the external device to be connected; and (b) transferring a dial tone corresponding to a number in real time through the modem whenever the user inputs the connection numbers one by one, if the virtual connection of the step (a) is achieved.

To achieve these and other objects in accordance with the principles of the present invention, as embodied and broadly described, the present invention provides a method of communicating using a computer communications apparatus, comprising the steps of: establishing a connection between a computer communications apparatus and a modem before a user inputs a number to said apparatus, said modem being disposed between said apparatus and a destination device, said apparatus being utilized to communicate with said destination device, said number being among a plurality of numbers corresponding to a telephone number of said destination device; and transferring a control signal from said apparatus through said modem when said connection is established, said step of transferring being performed in response to the user inputting a selected number from among said plurality of numbers, wherein said control signal corresponds to said selected number.

To achieve these and other objects in accordance with the principles of the present invention, as embodied and broadly described, the present invention provides a method of communicating using a computer communications apparatus, comprising the step of: establishing a connection between a computer communications apparatus and a modem before a user inputs a selected number to said apparatus, said modem being disposed between said apparatus and a destination device, said modem being coupled to a telephone cable disposed between said modem and said destination device, said apparatus being utilized to communicate with said destination device, said selected number being among a plurality of numbers corresponding to a telephone number of said destination device, wherein said step of establishing said connection further comprises the. sub-steps of: accessing said telephone cable; establishing said connection by providing a predetermined signal; determining when the user inputs said selected number; and generating a control signal corresponding to said selected number when said selected number is input, and then returning to said step of determining while said connection remains established.

To achieve these and other objects in accordance with the principles of the present invention, as embodied and broadly described, the present invention provides a method of communicating using a computer communications apparatus, comprising the steps of: establishing a connection between a computer communications apparatus and a modem before a user inputs a telephone number, said modem being disposed between said apparatus and a destination device, said apparatus being utilized to communicate with said destination device, said telephone number including a plurality of numbers and corresponding to said destination device, said modem being coupled to a telephone cable disposed between said modem and said destination device; and transferring in real time a dual tone multifrequency signal from said apparatus through said modem when said connection is established, said step of transferring being performed in response to the user inputting a selected number from among said plurality of numbers, wherein said dual tone multifrequency signal corresponds to said selected number.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
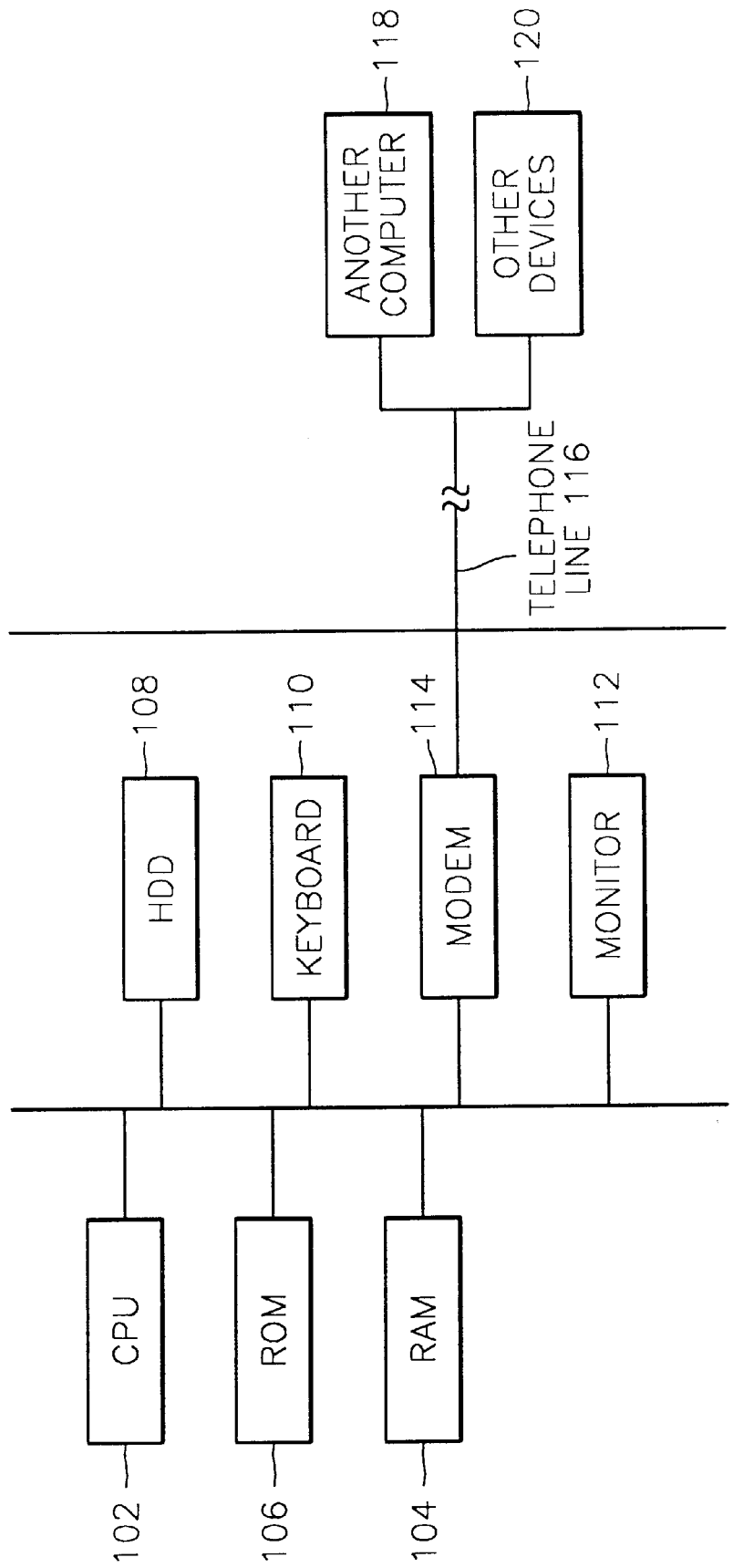
FIG. 1 is a block diagram of a computer communications system.

Turn now to FIG. 1, which is a block diagram of a computer communications system. The system shown in FIG. 1 includes a central processing unit (CPU) 102, a random access memory (RAM) 104 as a main memory, a read only memory (ROM) 106, a hard disk driver 108 for driving a hard disk as an auxiliary memory, an input device 110 (here shown as a keyboard), a monitor 112 as an output device, and a modem 114 for connecting to another computer 118 or other devices 120 via a telephone line 116. Note that the input device 110 can correspond to input devices other than a keyboard. For example, input device 110 can correspond to a mouse.

As shown in FIG. 1, in general, the modem 114 is necessary for computer communications. The modem 114 performs modulation for converting a digital signal used in a computer into an analog signal to be transmitted via a communications line such as a telephone line 116. The modem 114 also performs demodulation for restoring the received analog signal back into the original digital signal. Also, the modem 114 has a function of connecting to another computer or other devices. That is, when a user tries to connect to an external device via a modem, the modem transfers the telephone number of the external device to be connected as a dual tone multifrequency (DTMF) signal.

Figure 2:
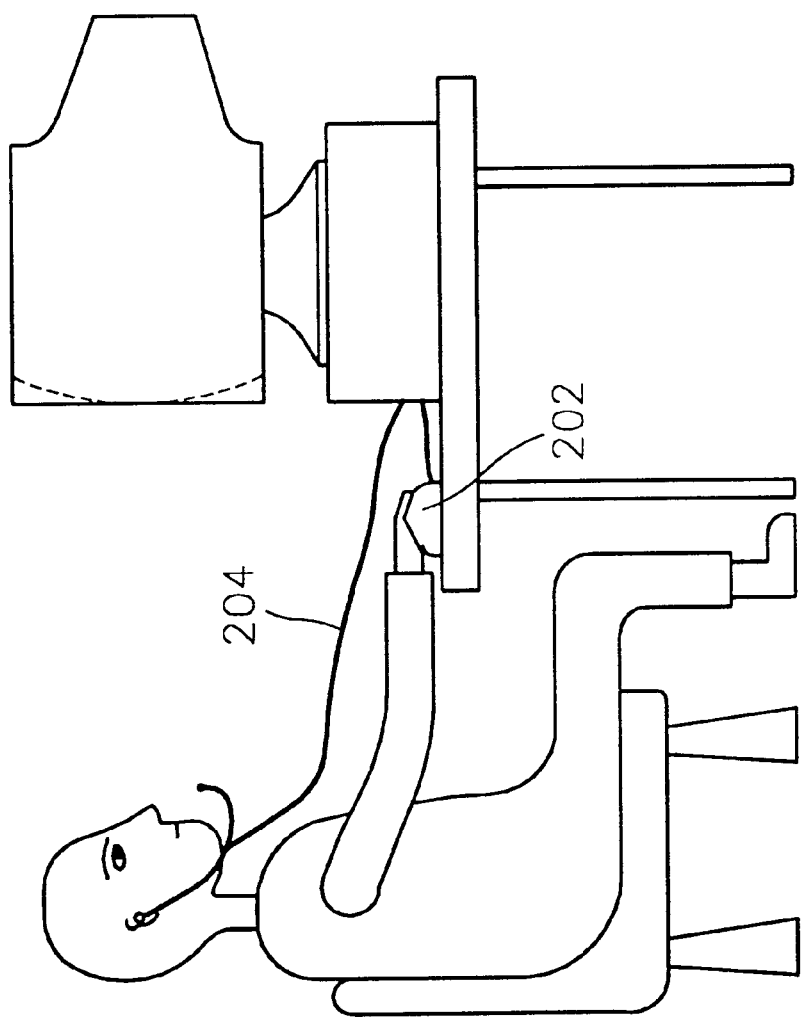
FIG. 2 illustrates a user performing communications using a computer.

Turn now to FIG. 2, which illustrates a user performing communications using a computer. The user executes communications software for computer communications with an external device, and tries to connect to the external device by inputting a telephone number of the external device. After connecting with the external device via a modem, the user communicates with the user of the external device using a mouse 202 as an input device, and a headset 204 having a microphone, as shown in FIG. 2.

Figure 3:
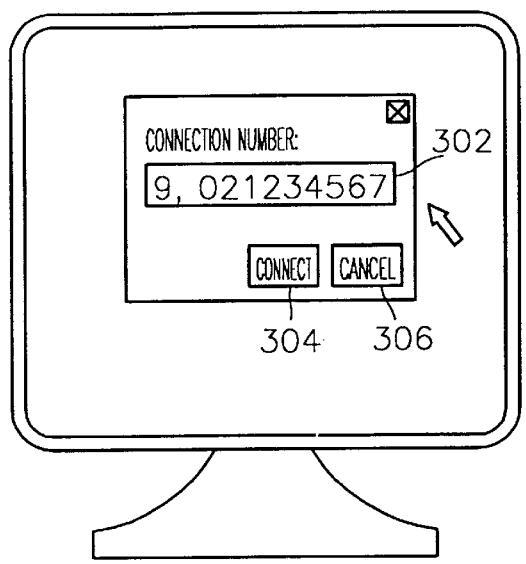
FIG. 3 shows an example of an initial display on a monitor for computer communications.

Turn now to FIG. 3, which shows an example of an initial display on a monitor for computer communications. FIG. 3 shows the initial display on a monitor when connection for computer communications starts. As shown in FIG. 3, the initial display for the computer communications provides a connection number input window 302, and selection buttons 304 and 306 for connect and cancel. Here, the connection number represents the telephone number of an external device to be connected.

In a method for connecting via a modem, the telephone number of the external device to be connected is transferred as dual tone multifrequency (DTMF) signals as in a method for telephoning using a standard tone telephone set. To do this, the user inputs the connection number in the connection number input window 302 shown in FIG. 3. However, in the dual tone multifrequency (DTMF) signal transferring method shown in FIG. 3, for the connection to an external device, a user should first input a full connection number in the connection number input window 302 shown in FIG. 3, and then select the connect button 303.

Figure 4:
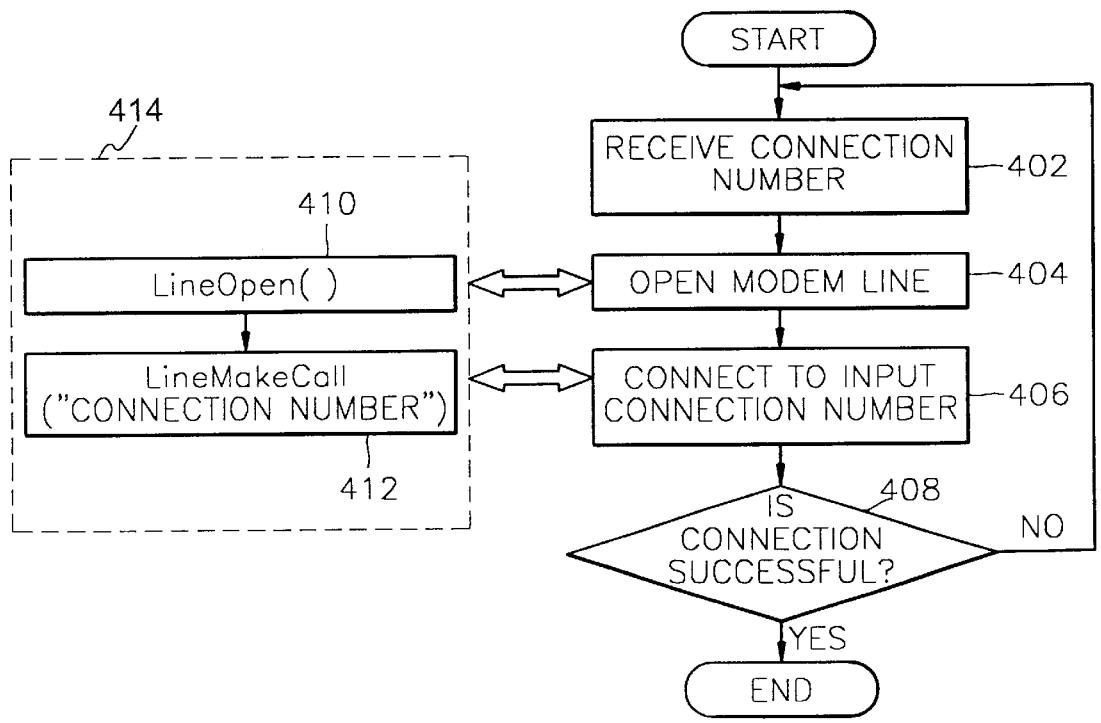
FIG. 4 is a flowchart illustrating a method for transferring a dual tone multifrequency (DTMF) signal for sending a telephone number.

Turn now to FIG. 4, which is a flowchart illustrating a method for transferring a dual tone multifrequency (DTMF)

signal for sending a telephone number. At step 402, a telephone number of an external device to be connected is input. The telephone number will include several individual digits. For example, in the United States of America, a telephone number can include seven individual digits. In some instances, a three-digit area code, sometimes referred to as a city code, must be used in addition to the seven-digit telephone number. In some instances the number 1 must be additionally used to make a long distance call. Also, in some instances, the number 9 must be additionally used to make a call to an external device located outside a business telephone network. Note that additional digits will be needed to make an international call, corresponding to a country code and other possible access numbers. The telephone numbers in countries other than the United States of America are similar in that they involve varying quantities of individual digits according to a variety of circumstances.

Here, at step 402 in FIG. 4, the input telephone number should be a full telephone number including all necessary individual digits. At step 404, after the full telephone number is input, a modem line is opened for dialing using a modem. Then, at step 406, the connection to the device corresponding to the input telephone number is performed via the opened modem line. Here, the telephone number is transferred as dual tone multifrequency (DTMF) signals. At step 408, after a predetermined time, a determination of whether or not the connection to the desired external device is completed is made. If the connection is not achieved, the control returns to the initial step 402, and then the steps 402 through 408 are repeated.

In FIG. 4, the box 414 formed by dashed lines includes functions 410 and 412 used for the steps 404 and 406, respectively, which are the functions of Microsoft Windows (R) Telephony Application Program Interface (TAPI). The function 410 is LineOpen ( ) and is a function for opening the modem line. The function 412 is LineMakeCall ("connection number") and is a function for dialing the corresponding telephone number.

As described above with reference to FIGS. 3 and 4, after a full telephone number to be connected is input, connection to an external device is attempted, which is different from a general telephoning method using a standard tone telephone set. That is, in a method using a standard tone telephone set, whenever a user inputs a telephone number, the corresponding individual numbers are transferred to the telephone line in real time. However, in the method for transferring dual tone multifrequency (DTMF) signals, according to FIGS. 3 and 4, the corresponding telephone number is transferred only after the full telephone number is input. Thus, the method for transferring dual tone multifrequency (DTMF) signals, according to FIGS. 3 and 4, does not provide real time transmission.

The present invention does provide real time transmission. Thus, a real time dual tone multifrequency (DTMF) signal. transferring method, which has much flexibility in communicating with the opposite computer system, is required, for computer communications. A new real time dual tone multifrequency (DTMF) transferring method, in accordance with the principles of the present invention, would be highly desirable in computer communications because such a new method would allow a computer system to more closely correspond to a standard tone telephone set. Accordingly, the computer system would be able to have the same flexibility and convenience of a standard tone telephone set, and the computer system would also have the added capabilities associated with computers. In particular, a function of inputting other numbers after connection, required in a voice mail service or radio paging can be easily achieved in the computer communications system of the present invention.

In a method for transferring dual tone multifrequency (DTMF) signals in real time, in accordance with the principles of the present invention, when a user starts to communicate with an external device via a modem, each individual digit of a telephone number is transferred in real time on inputting the telephone number, as in a telephoning method using a standard tone telephone set. To this end, a virtual connection is achieved before the actual individual digits of the connection number are input. Here, the connection number corresponds to the full telephone number of the external device with which the user wants to communicate. Note that the "dial tone" in the Title above corresponds to the dual tone multifrequency (DTMF) signal earlier discussed.

Figure 5:
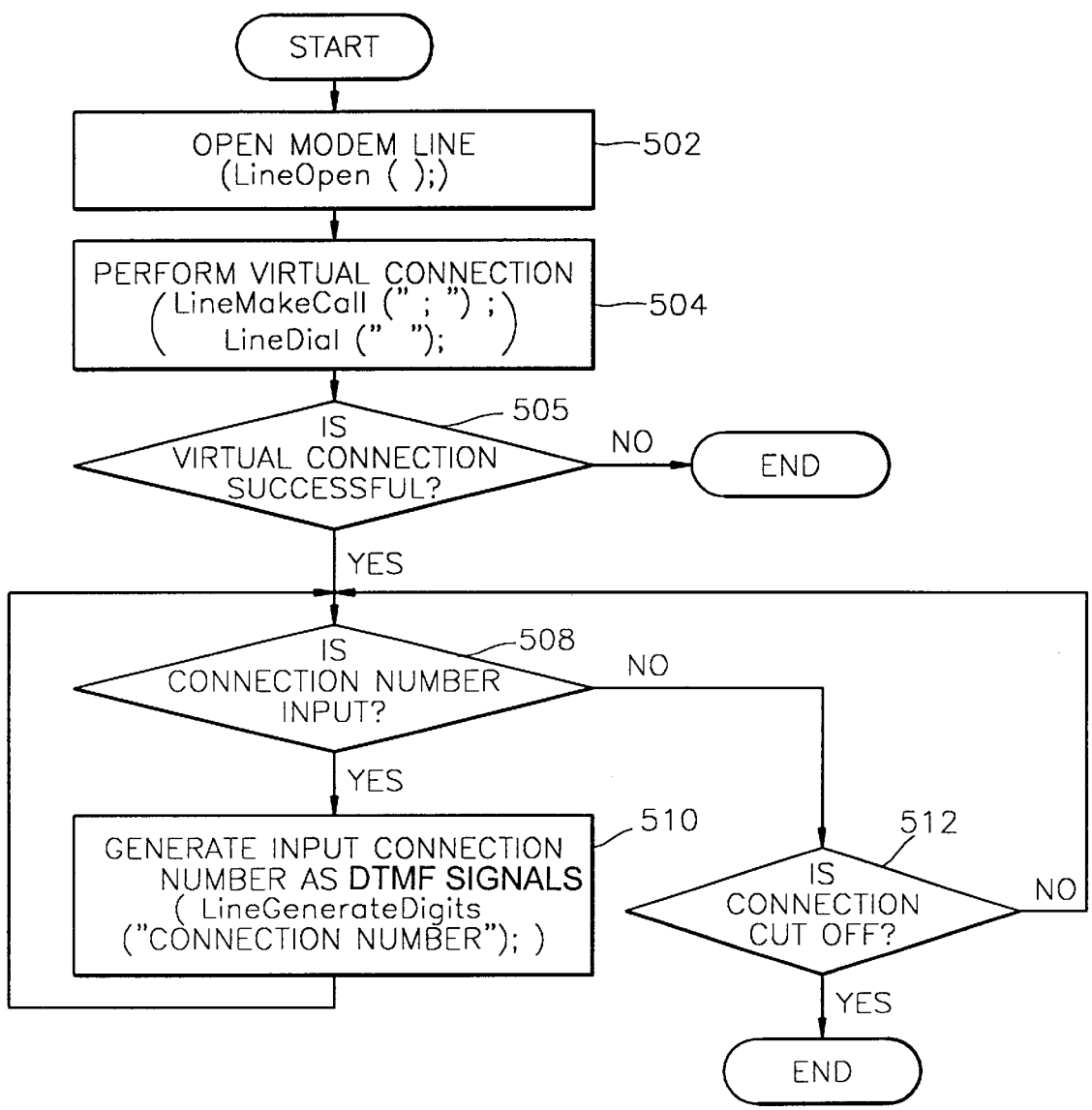
FIG. 5 is a flowchart illustrating a method transferring a dual tone multifrequency (DTMF) signal for sending a telephone number in real time, in accordance with the principles of the present invention.

Turn now to FIG. 5, which is a flowchart illustrating a method transferring a dual tone multifrequency (DTMF) signal for sending a telephone number in real time, in accordance with the principles of the present invention. At step 502, when starting to telephone via a computer system and a modem, a modem line is opened before a user inputs connection numbers. At step 502, the modem line is opened by a function, for example, a function such as LineOpen ( ); which is a modem line open function.

In FIG. 5 at step 504, even if the connection numbers are not input yet, the user's computer system is connected to a switching center by a predetermined symbol, that is, by a virtual connection number. Such connection using a virtual number is called a virtual connection. That is, the connection with the opposite site through the switching center is virtually achieved, while actual connection with the opposite site is not achieved.

Thus, the method shown in FIG. 5 is not the same as the method shown in FIG. 4. Unlike the method for transferring a dual tone multifrequency (DTMF) signal for sending a telephone number shown in FIG. 4, the user's computer of the method of FIG. 5 is connected to a telephone is line through virtual communications before the connection numbers are input, to be ready to receive the connection numbers. Such a virtual connection state provides the same effect as when a user hears a ready tone by lifting the handset of a standard tone telephone set.

In FIG. 5 at step 504, the virtual connection is achieved using a function, for example, LineMakeCall ("; "); as a non-synchronous dialing function and LineDial(" "); as a synchronous dialing function, which are performed in sequence. Here, the non-synchronous dialing function LineMakeCall( ); is a function for receiving a full connection number in sequence and then collectively transferring the connection numbers as dial tones. In particular, when a semicolon ("; ")is attached to the connection numbers, the next connection number is input after a predetermined time delay, and then the full connection number is collectively transferred as dual tone multifrequency (DTMF) signals. That is, the semicolon ("; ") requests a temporal delay for receiving the remaining connection numbers to be sent via the modem. That is, a predetermined time can be delayed using a symbol, that is "; ", instead of using the number when the connection number is transferred as dual tone multifrequency (DTMF) signals. As a result, connection is achieved virtually.

The synchronous dialing function LineDial ( ); is a function for receiving the input connection numbers in sequence and collectively transferring the connection numbers as dial tones. However, the connection numbers are continuously input without using a semicolon (";"). Based on the characteristics of the above two functions, a semicolon ("; ")as a virtual number is used as an input value for the function LineMakeCall ("; "); and a blank (" ")is provided as an input value for the function LineDial(" ");. As a result, a virtual connection, in which the user's computer acts as if it were connected to the opposite computer, is achieved. That is, instead of connecting the user's computer to the opposite computer via a modem, the user's computer is connected to the modem itself, which is regarded as the opposite site, via a switching center, resulting in a virtual connection and not a real connection.

In FIG. 5 at step 505, a determination of whether or not the virtual connection is achieved. If the virtual connection is achieved, then step 508 is performed. If the virtual connection is not achieved, then the dialing operation stops. The user can restart the dialing process via the modem at step 502.

In FIG. 5 at step 508, the virtual connection has been deemed to be successful and connection numbers of an intended external device can be input. At step 508, it is determined whether or not a user inputs at least one connection number. Here, the connection number may be a general telephone number including the * and # buttons, or a connection address. At step 510, when the user inputs the connection numbers, the input connection numbers are generated as dual tone multifrequency (DTMF) signals. At step 510, when the user inputs the connection numbers, a function generating dual tone multifrequency (DTMF) signals corresponding to the input number is used. The LineGenerateDigits("connection number"); function is one example of such a function.

The step 508 is performed continuously, and the corresponding number is generated in step 510 as a dual tone multifrequency (DTMF) signal whenever the user inputs the connection number. That is, the input connection number is provided as an input value of the function LineGenerateDigits("connection number"); to generate a dual tone multifrequency (DTMF) signal of the corresponding connection number. Here, the function of generating a dual tone multifrequency (DTMF) signal from the connection numbers, LineGenerateDigits("connection number");, is usable when the connection is achieved, and generates a tone signal immediately whenever a user inputs the connection numbers one by one, providing the same effect as when a dual tone multifrequency (DTMF) signal is generated by dialing using a standard tone telephone set. That is, the connection numbers are transferred as dual tone multifrequency (DTMF) signals in real time.

In FIG. 5 at step 512, when no connection number is input in step 508, a determination of whether the connection is cut off by a user or the device connected via the modem is made. If the connection is cut off, dialing is stopped. If it is determined in step 512 that the connection is not cut off, the control flow returns to the step 508 to determine whether or not the user inputs a connection number. And then the corresponding number is immediately generated in step 510 as a dual tone multifrequency (DTMF) signal using the function of LineGenerateDigits( ); in response to a user inputting a connection number in step 508. Also, when the connection is not cut off and the user does not input a connection number, that is, when the user communicates with the opposite person, a loop of the steps 508 and 512 is repeated.

The virtual connection in a modem, using the Microsoft Windows(R) Telephony Application Program Interface (TAPI) function, can be summarized as follows.

LineMakeCall (m_hLine, &m_hCall, ";", 0,0);
...
LineDial(m_hCall, " ", 0);
WaitForConnect();
...
LineGenerateDigits(m_hCall, LINEDIGITMODE_DTMF, "1234", 0);

Here, m_hLine represents a user's modem line handle, and m_hCall represents a modem line handle to be connected. When calling the LineMakeCall function, the semicolon ";" is dialed as described above. Then, by dialing the blank (" ") as input value of the LineDial function, the connection is achieved virtually.

Figure 6:
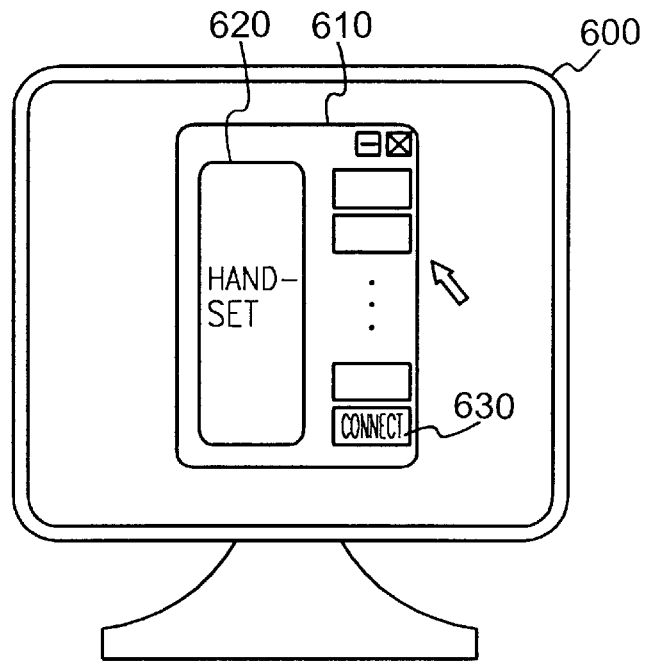
FIG. 6 shows an first display for telephoning, in accordance with the principles of the present invention.

Turn now to FIG. 6, which shows an first display for telephoning, in accordance with the principles of the present invention. Also turn to FIG. 7, which shows a second display for telephoning, in accordance with the principles of the present invention. As described above, the method for transferring dual tone multifrequency (DTMF) signals in real time provides the same effect as when a user makes a call using a standard tone telephone set.

Figure 7:
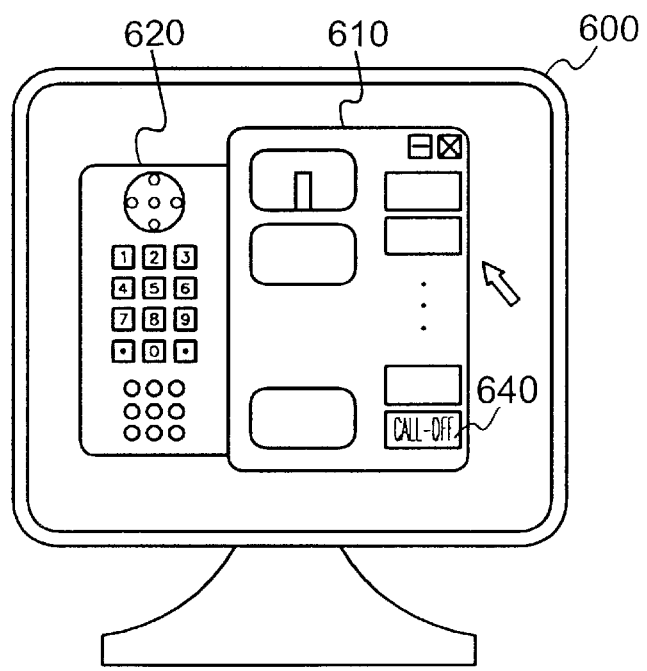
FIG. 7 shows a second display for telephoning, in accordance with the principles of the present invention.

FIG. 6 includes a computer monitor 600, an image of a telephone program 610 shown on the monitor 600, an image of a telephone handset 620 shown on the monitor 600, and a connect menu 630 shown on the monitor 600. FIG. 7 includes the computer monitor 600, the image of the telephone program 610, an image of a telephone handset 620 overturned, and a call-off menu 640. The connect menu 630 and call-off menu 640 can be made to correspond to a connect button and cancel button, respectively.

When a user selects the "connect" menu 630 using an input device such as a mouse or keyboard (not shown) on the initial display 610 shown in FIG. 6, a modem line is opened for a virtual connection. When the virtual connection is completed, the initial display of FIG. 6 is changed into the display 610 of FIG. 7 which illustrates a handset 620 picked up from the main body of the telephone 610. When the user inputs connect numbers one by one on the display shown in FIG. 7, the corresponding connect number is transferred as dual tone multifrequency (DTMF) signals in real time.

The user can input connect numbers 0 through 9 and symbols * and # one by one using an input device such as a mouse (not shown) to click on the numbers and symbols of the handset 620 shown in FIG. 7. Alternatively, the user can input connect numbers 0 through 9 and symbols * and # one by one using an input device such as a numeric keypad of a keyboard (not shown) to select and enter the numbers 0 through 9 and symbols * and #.

As described above, the method for transferring dual tone multifrequency (DTMF) signals in real time according to the present invention is unlike a method where the connection is performed after collectively receiving all the connection numbers. That is, the method for transferring dual tone multifrequency (DTMF) signals in real time according to the present invention has the connection being achieved virtually first, and then each corresponding connection number is transferred as a dual tone multi frequency (DTMF) signal in real time whenever a user inputs the connection numbers one by one. As a result, the same effect as in a standard tone telephone set can be achieved in computer communications for telephoning using a modem.

In particular, a function of inputting other numbers after connection, required in a voice mail service or radio paging can be easily achieved in the computer communications system of the present invention.

The foregoing paragraphs describe the details of the present invention as it relates to computer communications, and more particularly to a method for transferring a real-time dial tone in a computer communications system for connecting to an external device via a modulator-demodulator (modem).

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of communicating using a computer communications apparatus, comprising the steps of:
    establishing a connection between a computer communications apparatus and a modem before a user inputs a number to said apparatus, said modem being disposed between said apparatus and a destination device, said apparatus being utilized to communicate with said destination device, said number being among a plurality of numbers corresponding to a telephone number of said destination device; and
    transferring a control signal from said apparatus through said modem when said connection is established, said step of transferring being performed in response to the user inputting a selected number from among said plurality of numbers, wherein said control signal corresponds to said selected number.

2. The method of claim 1, wherein said control signal corresponds to a dual tone multifrequency signal.

3. The method of claim 2, wherein said dual tone multifrequency signal is transferred in real time in response to the user inputting said selected number.

4. The method of claim 1, wherein said modem corresponds to said destination device only during said step of establishing said connection.

5. The method of claim 1, wherein said plurality of numbers corresponds to 0, 1, 2, 3, 4, 5, 6, 7, 8, 9, *, and #.

6. The method of claim 1, wherein said apparatus further comprises a mouse input unit and a display unit displaying said plurality of numbers, the user inputting said selected number to said apparatus utilizing said mouse input unit.

7. The method of claim 1, wherein said apparatus further comprises a keyboard including keys corresponding to said plurality of numbers, and the user inputs said selected number to said apparatus utilizing said keyboard.

8. The method of claim 1, further comprising:
    a modem cable coupling said apparatus and said modem; and
    a telephone cable coupling said modem with a central office.

9. The method of claim 8, wherein said step of establishing said connection further comprises the sub-steps of:
    accessing said telephone cable to begin a communication session;
    establishing said connection before said selected number is input, by providing a predetermined signal;
    determining when said connection is established; and
    terminating said communication session when said connection is not established.

10. The method of claim 1, wherein said step of transferring said control signal from said apparatus through said modem further comprises the sub-steps of:
    determining when the user inputs said selected number; and
    generating said control signal immediately in response to said selected number being input, and returning to said step of determining while said connection remains established.

11. A method of communicating using a computer communications apparatus, comprising the step of:
    establishing a connection between a computer communications apparatus and a modem before a user inputs a selected number to said apparatus, said modem being disposed between said apparatus and a destination device, said modem being coupled to a telephone cable disposed between said modem and said destination device, said apparatus being utilized to communicate with said destination device, said selected number being among a plurality of numbers corresponding to a telephone number of said destination device, wherein said step of establishing said connection further comprises the sub-steps of:
    accessing said telephone cable;
    establishing said connection by providing a predetermined signal;
    determining when the user inputs said selected number; and
    generating a control signal corresponding to said selected number when said selected number is input, and then returning to said step of determining while said connection remains established.

12. The method of claim 11, further comprising the step of transferring said control signal from said apparatus through said modem.

13. The method of claim 11, wherein said control signal corresponds to a dual tone multifrequency signal.

14. The method of claim 13, wherein said dual tone multifrequency signal is transferred in real time in response to the user inputting said selected number.

15. The method of claim 12, wherein said modem corresponds to said destination device only during said step of establishing said connection.

16. A method of communicating using a computer communications apparatus, comprising the steps of:
    establishing a connection between a computer communications apparatus and a modem before a user inputs a telephone number, said modem being disposed between said apparatus and a destination device, said apparatus being utilized to communicate with said destination device, said telephone number including a plurality of numbers and corresponding to said destination device, said modem being coupled to a telephone cable disposed between said modem and said destination device; and
    transferring in real time a dual tone multifrequency signal from said apparatus through said modem when said connection is established, said step of transferring being performed in response to the user inputting a selected number from among said plurality of numbers, wherein said dual tone multifrequency signal corresponds to said selected number.

17. The method of claim 16, wherein said apparatus further comprises a display unit displaying said plurality of numbers, said display unit being selected from among a cathode ray tube, a liquid crystal display, a gas-plasma display, a light emitting diode display, an electroluminescent display, and a field emission display.

18. The method of claim 16, wherein said apparatus further comprises a storage unit storing said telephone number, said storage unit being selected from among a floppy disk drive, a compact disc drive, a digital versatile disc drive, and a hard disk drive, said user inputting said selected number by utilizing said storage unit storing said telephone number.

19. The method of claim 16, wherein said step of establishing said connection further comprises the sub-steps of:

accessing said telephone cable to begin a communication session;

establishing said connection before said selected number is input, by providing a predetermined signal;

determining when said connection is established; and terminating said communication session when said connection is not established.

20. The method of claim 19, wherein said step of transferring said dual tone multifrequency signal from said apparatus through said modem further comprises the sub-steps of:

determining when the user inputs said selected number; and generating said dual tone multifrequency signal immediately in response to said selected number being input, and returning to said step of determining while said connection remains established.

* * * * *